(12) United States Patent
Constantinou et al.

(10) Patent No.: US 7,039,927 B2
(45) Date of Patent: May 2, 2006

(54) INDICATION DEVICE AND ARTICLE INCORPORATING SAME

(75) Inventors: Andreas Sotiriou Constantinou, Solihull (GB); Marios Panikos Sotiriou, Solihull (GB); Guy Davies, Stratford-Upon-Avon (GB)

(73) Assignee: 3Lfants Limited, Solihull (GB)

( * ) Notice: Subject to any disclaimer, the term of this patent is extended or adjusted under 35 U.S.C. 154(b) by 389 days.

(21) Appl. No.: 10/204,732

(22) PCT Filed: Mar. 14, 2001

(86) PCT No.: PCT/GB01/01099

§ 371 (c)(1),
(2), (4) Date: Aug. 22, 2002

(87) PCT Pub. No.: WO01/71717

PCT Pub. Date: Sep. 27, 2001

(65) Prior Publication Data

US 2003/0031115 A1  Feb. 13, 2003

(30) Foreign Application Priority Data

Mar. 18, 2000  (GB) .................................. 0006512
May 18, 2000  (GB) .................................. 0011904
Oct. 11, 2000  (GB) .................................. 0024859

(51) Int. Cl.
*G11B 3/70* (2006.01)
*G11B 5/84* (2006.01)
*G11B 7/26* (2006.01)
*G01L 19/12* (2006.01)
*G01P 15/00* (2006.01)

(52) U.S. Cl. ...................... 720/718; 116/271; 116/274; 116/318; 73/514.04; 73/514.09

(58) Field of Classification Search ................ 369/273, 369/282, 292; 73/514.03, 514.05, 514.15, 73/514.09, 500, 501, 762, 37, 40, 40.5 R; 116/208, 212, 227, 264, 266, 271, 273, 274, 116/284, 298, 309, 318; 720/718
See application file for complete search history.

(56) References Cited

U.S. PATENT DOCUMENTS 3,921,434 A * 11/1975 Lowen et al. .................. 73/37

FOREIGN PATENT DOCUMENTS

| JP | 60219559 A | * | 11/1985 |
| JP | 11250644 A | * | 9/1999 |
| JP | 11339442 A | * | 12/1999 |

OTHER PUBLICATIONS

"Rotation Sensor," Jul. 1, 1967, IBM Technical Disclosure Bulletin, vol. 10, Iss. No. 2, page No. 137.*

*Primary Examiner*—William J Klimowicz
(74) *Attorney, Agent, or Firm*—James P. Hanrath

(57) ABSTRACT

A disc or like article (10, 115, 119) rotatable by drive means, such as a compact disc for use with a computer, includes indication means (12, 110, 120) which, when the disc is rotated at or above a predetermined angular velocity, provide an indication that rotation has occurred, which indication can be important if the disc contains confidential information. The indication device can be a tube formed with two enclosures separated by a breakable membrane (15, 16, 112, 122), a colored liquid/gel (17, 111 121) being in one enclosure and passing into the second enclosure, by breaking the membrane, when the disc is spun, thereby providing a visual indication thereafter of the spinning having occurred The invention also relates to such an indication means, per se, for after-fitting to a disc recorded on by spinning, and to a method of producing a disc with said indication means.

54 Claims, 5 Drawing Sheets

Figure 4:
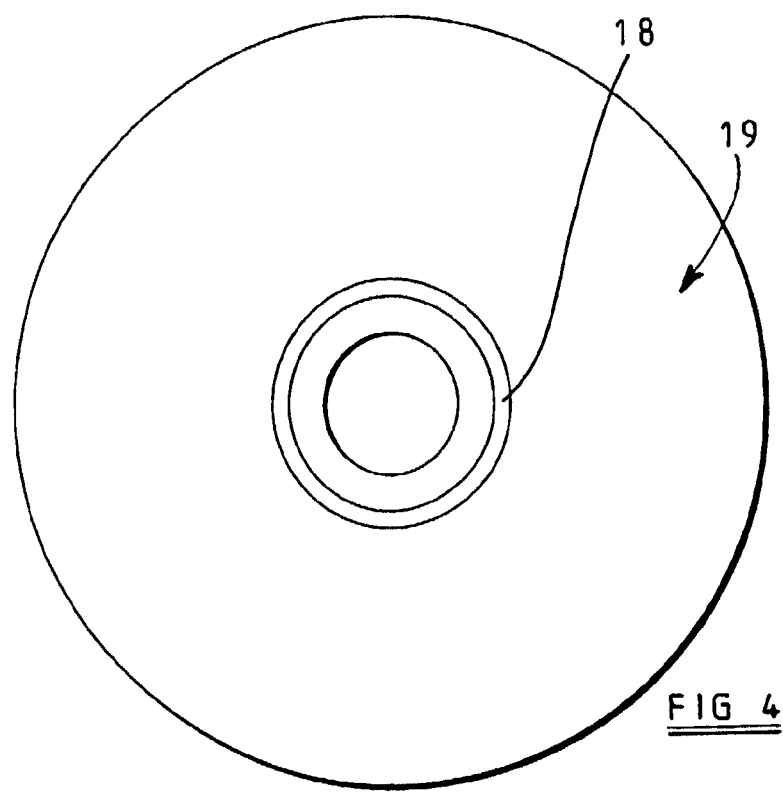

U.S. PATENT DOCUMENTS 5,221,186 A * 6/1993 Machin ........................ 416/61
6,011,772 A * 1/2000 Rollhaus et al. ............ 369/286
6,314,907 B1 * 11/2001 Harris et al. ................. 116/206
6,597,532 B1 * 7/2003 Usui et al. ............... 360/97.03

* cited by examiner

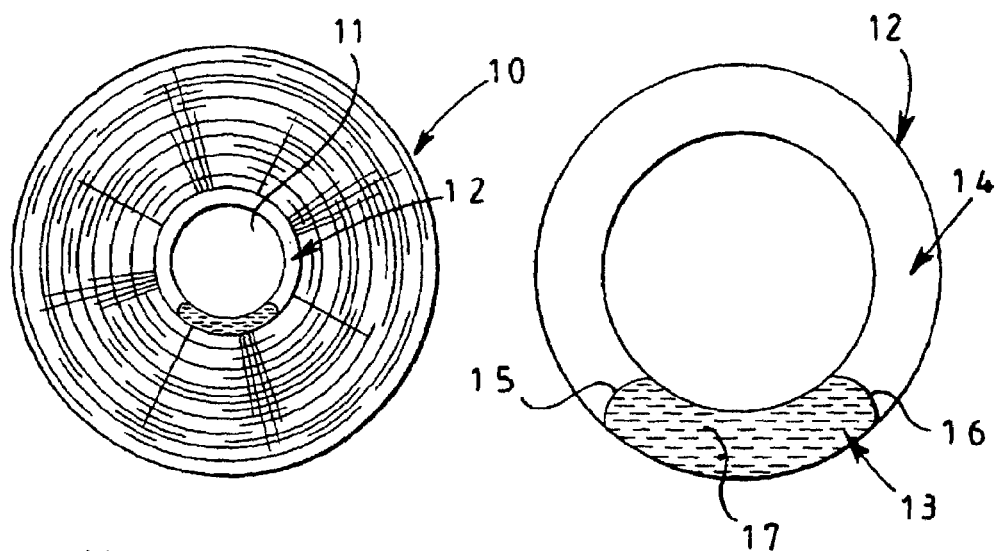
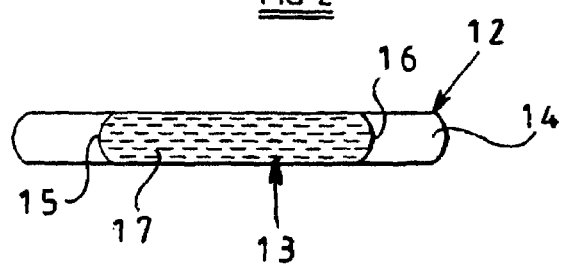

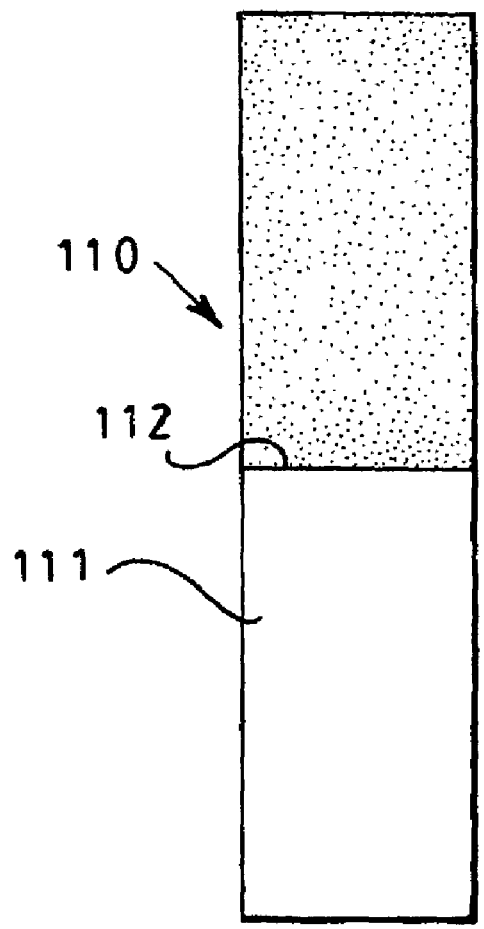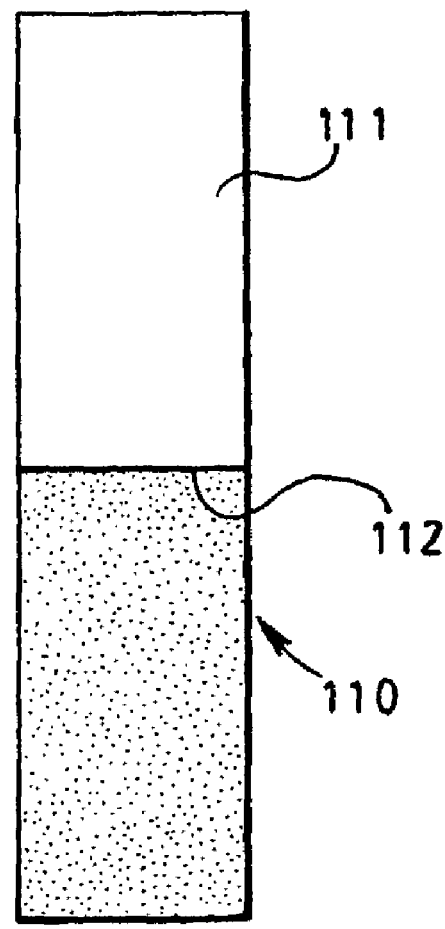
FIG 6
FIG 7

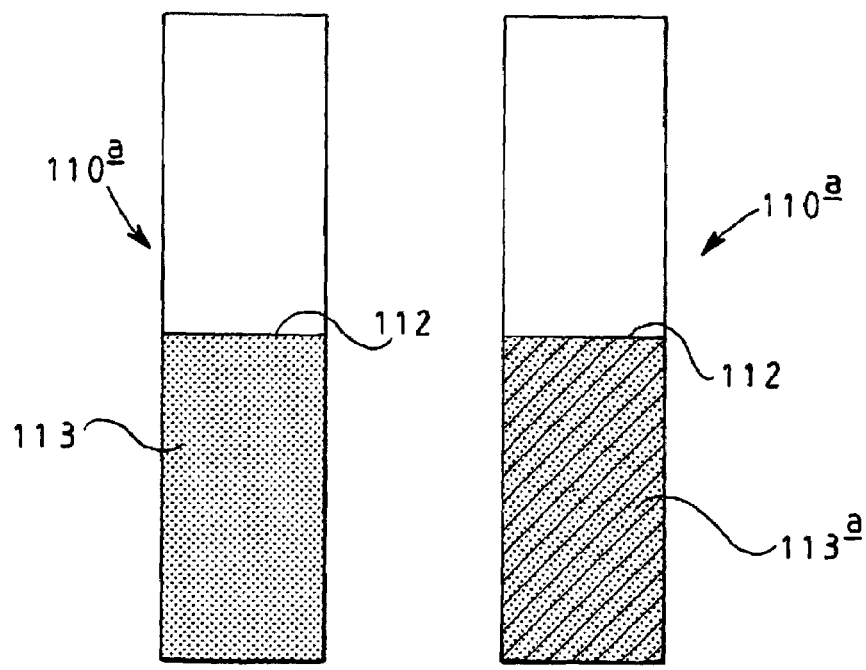
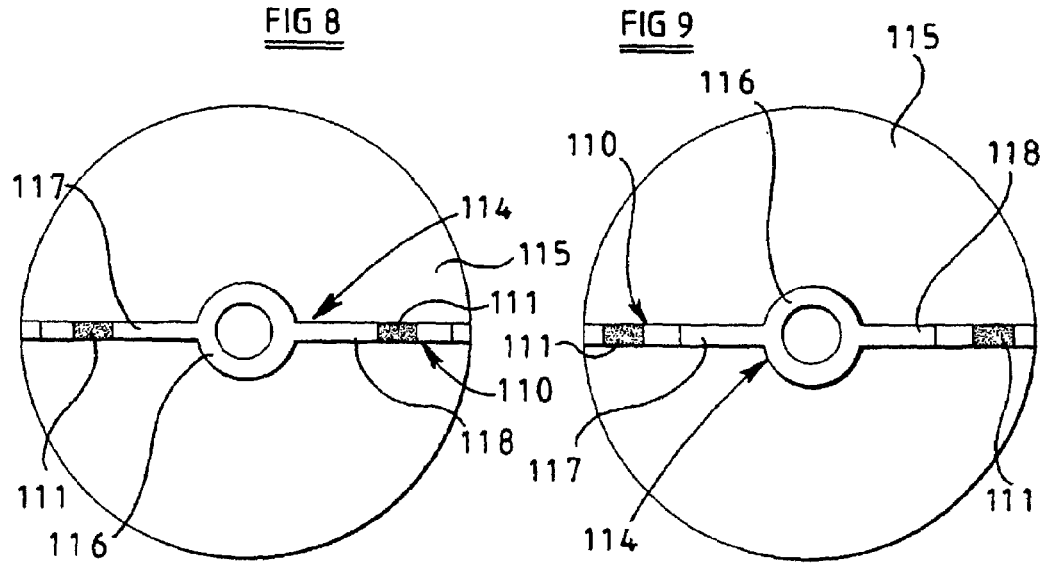

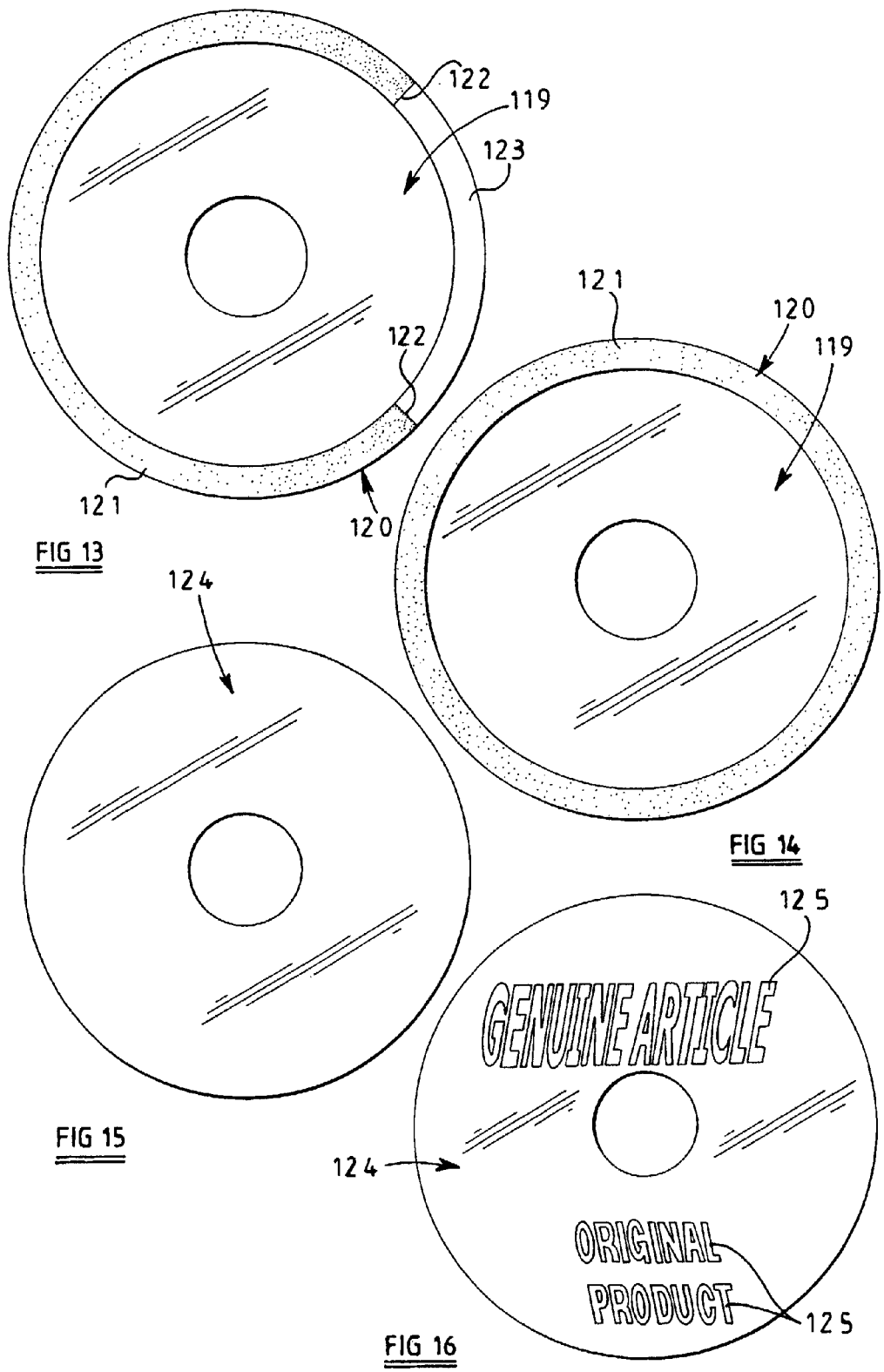

INDICATION DEVICE AND ARTICLE INCORPORATING SAME

This invention relates to an indication device and also to an article incorporating same, and has particular application to compact discs. Hereinafter, a disc or the like article will be referred to for convenience as 'a disc'.

Compact discs, particularly those used in the computer industry, often contain confidential information. Presently there is no means of telling merely from looking at such a compact disc whether the information thereon has been retrieved i.e. whether the disc has been rotated on a disc drive.

An object of the invention is to address this problem.

According to a first aspect of the invention an indication device for a disc rotatable by drive means, in use, comprises indication means or indication producing means, said means, upon the device being rotated, in use, at or above a predetermined angular velocity, providing an indication that rotation has occurred.

Preferably in said first aspect of the invention an indication device for a disc rotatable by drive means, in use, comprises a first enclosure, indication means in said first enclosure, and a second enclosure, the indication means being retained in the first enclosure until the device is rotated, in use, at or above said predetermined angular velocity, whereupon there is passage of at, least some of the indication means into the second enclosure and a resultant indication that said rotation of the device has occurred, which, indication most preferably, is visual, and is visible, or can be viewed, exteriorly of the device.

Advantageously the first enclosure is separated from the second enclosure by separation means, such as membrane means which break(s) when the device rotates, in use, at or above said predetermined angular velocity. Desirably the device is a transparent circular tube. Conveniently the indication means is a fluid, i.e. a liquid or gas, or a solid, and advantageously is coloured. The device, in use, is applied to a 'recorded' disc by an applicator, and may be adhered thereto by means of a high performance sticker. In another embodiment the indication means is coloured water or other liquid which is held in the first enclosure by surface tension at an outlet opening. Upon said rotation of the device, and thus the creation of a centrifugal force, the liquid is 'pushed' through the outlet opening into the second enclosure. In a still further embodiment, there is a (different) clear liquid or gas in each of the enclosures respectively. When said rotation occurs, and the or each separation means breaks or otherwise ceases to retain the liquids or gases in their respective enclosures, the liquids or gases mix, these being selected so as to produce, on mixing, a coloured composition which acts as said visual indication.

According to a second aspect of the invention there is provided a disc rotatable by drive means, in use, the disc incorporating indication means, or indication producing means, the indication means or indication producing means, upon the disc being rotated, in use, at or above a predetermined angular velocity, providing an indication that rotation has occurred.

Preferably in a further aspect of the invention there is provided a disc rotatable by drive means which incorporates a device according to said preferable first aspect of the invention.

Desirably the device is incorporated into the disc or like article during its manufacture. The device is embedded in the article thickness or is sandwiched between the two outer article layers. With this arrangement a master disc carrying its information could be used to produce copies by pressing, so that there is no 'spinning' which would break the membrane(s) between the two enclosures. The device is conveniently fitted at the central hole through the disc, but it could instead be around the disc outer periphery.

Figure 5:
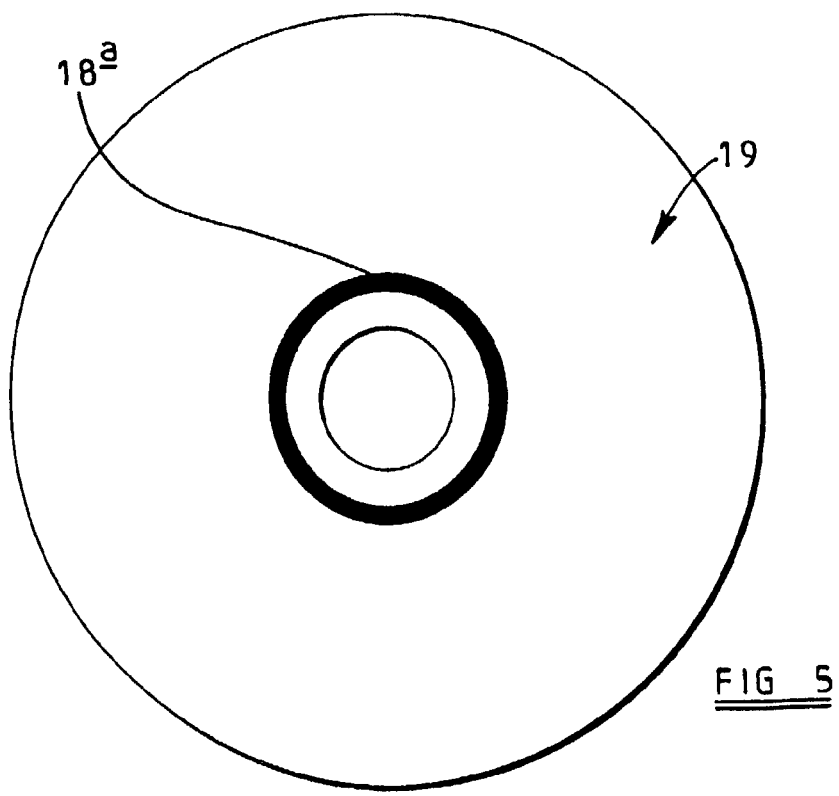

The invention will now be described, by way of example, with reference to the accompanying drawings, in which:

FIG. 1 is a schematic plan view of a compact disc in accordance with said further aspect of the invention, FIG. 2 is an enlarged schematic plan view of an indication device of the first aspect of the invention, FIG. 3 is a side view of the device of FIG. 2, FIGS. 4 and 5 respectively show a disc according to a first alternative embodiment of the invention, before and after activation of the indication means, FIG. 6 shows a top view of an indication device of a second alternative embodiment before being subjected to centrifugal force, FIG. 7 shows the device of FIG. 6 after being subjected to centrifugal force, FIG. 8 shows an indication device as in FIG. 6 but containing photochromic material, the device being shown before exposure to UV light, FIG. 9 shows the device of FIG. 8 after exposure to UV light, FIG. 10 is a plan view of an optical disc to which is attached a skeleton frame carrying the devices of FIGS. 6 and 7, or FIGS. 8 and 9, FIG. 11 is a plan view of the disc of FIG. 10 after spinning of the disc, FIG. 12 is a side view of the disc of FIGS. 10 and 11, FIG. 13 is a plan view of an optical disc of a third alternative embodiment with an indication device around its periphery, before the device is subjected to centrifugal force, FIG. 14 is a plan view of the disc of FIG. 13, after it has been spun, FIG. 15 is a plan view of an optical disc of a fourth alternative embodiment, incorporating photochromic material, and shown before exposure to UV light, and FIG. 16 is a plan view of a disc of FIG. 15, after its exposure to UV light.

Although these specific embodiments of the invention disclosed and illustrated herein relate specifically to a compact disc, the application does in fact have general applicability to any type of information carrying article, which information is retrieved/read, in use, by suitable retrieving/reading means when the article is rotated on a suitable drive means, generally at a very high angular velocity. Thus although ordinarily the article to which the invention is applied will be a compact disc or CD ROM which carries information for use in a computer, or a compact disc on which music, film or speech has been recorded, the invention may nevertheless have applicability to other types of articles which are rotatable on drive means, and in respect of which it is wished to be able to establish whether or not the article has ever been subject to such rotation, for security considerations.

FIG. 1 shows schematically a circular compact disc 10 of any known type, for example containing information for use in operating a computer, containing information which can be read in a computer, or a music/film CD The disc has a central circular hole 11 therethrough, but in the embodiment shown in FIG. 1, there is a tube 12, which is circular in plan, i.e. toroidal, at the inner extremity of the recorded disc where the hole 11 begins. FIGS. 2 and 3 show this tube 12 in enlarged form, and, as will be described herein below, the tube 12 itself is constructed in accordance with one aspect of the present invention, with a tube incorporated in and forming part of a compact disc, as shown in FIG. 1, being in accordance with a further aspect of the invention. The tube can have a laterally or radially outwardly extending part sandwiched between layers of the disc or otherwise incorporated into the disc structure.

The tube 12 is hollow and, in this embodiment, is wholly transparent, being produced, for example, of clear plastics or other suitable material. The tube is divided into a first enclosure 13 and a second enclosure 14 by respective membranes 15,16 defining opposite ends of the first enclosure. Although not essential, the degree of arc around which the second enclosure extends will generally be much greater than the degree of arc over which the first enclosure extends around the tube 12, and in the example shown in FIG. 2, the ratio of extent of the two enclosures is approximately 3:1. The membranes 15,16, can be of any suitable material/form, provided that, as described below, they break/rupture when the tube 12 and/or the disc 10 incorporating the tube 12 rotates at or beyond a predetermined angular velocity.

Contained within the enclosure 13 is indication means 17 which can be of any suitable form, it merely being required that it is visually possible to detect the presence of the indication means in the second enclosure 14 upon rupture/breakage of one or both of the membranes. Although normally the second enclosure 14 would contain only air prior to rupture/breakage of the membranes 15,16, this need not be the case provided that it could be visually determined when the indication means pass into this enclosure upon said above-mentioned rotation at or above predetermined angular velocity.

Preferably the indication means is a low viscosity liquid which is desirably coloured so that its passage into the second enclosure 14 will be easily visible exteriorly of the device and also of the disc to which the device is fitted. However in other embodiments the liquid need not be of low viscosity, and instead of a liquid, a gaseous fluid, preferably of low viscosity, and/or preferably coloured, could be used in the enclosure 13. Moreover the indication means could instead be a solid, for example particulate material, and in a yet further example, the indication means could be any combination of the examples quoted as indication means. Preferably the membranes are in the form of thin breakable plastic films or sheets, which although designed to fracture/break/rupture at a predetermined angular velocity, are sufficiently strong to allow transportation of the tube itself, or the tube fitted to a compact disc. In other words normal transportation impacts can be absorbed leaving the membranes undamaged.

However the membranes are designed and/or are of a material which will assuredly fracture/rupture/break when the device is subjected to the above-mentioned predetermined angular velocity, this being, for example, the typical speed at which a compact disc drive operates with known computer equipment, CD players and the like. However the membranes can be produced so as to fracture/rupture/break at any desired speed, it merely being necessary to ensure that the indication means enter the second enclosure 14 even if the device/disc has been run momentarily on a disc drive or equivalent. At said predetermined angular velocity, there is a certain centrifugal force applied to the indication means 17 in the enclosure 13, and this force, in conjunction with the design of the membranes, ensures that when the membranes rupture/break/fracture, the indication means passes into the second enclosure 14 so that, in the embodiment described, the indication means then fills the whole of the interior of the tube 12, thus producing an exteriorly visible ring of colour or equivalent visual indication means. Subsequently anyone looking at said tube can tell that it had been subject to rotation, so that an associated disc could have been read, i.e. the contents had retrieved at least once. The tube thus in this case acts as a security device to alert, for example, the recipient of the compact disc that information intended to be sent on a secure basis by the sender of the CD had been subject to a security breach during transit.

It will be appreciated that as far as the visible indication is concerned, it is merely necessary that someone checking the security is able to establish a change in the appearance of a particular area of the device, for example a change from a clear empty area before rotation contrasted with the presence of indication means in said area after rotation. Accordingly it will be appreciated that the whole of the device need not be visible at all, and in particular the first enclosure 13 could be concealed from view at all times, it merely being necessary that the second enclosure 14, or at least a part thereof is always visible, or can be visually inspected, to allow the contrast referred to above to be detected so as to enable it to be determined that the membrane or membranes separating the part of the device containing the indication means from the exteriorly visible part of the device has or have been ruptured by rotation. If required, the visible part of the enclosure 14 could have a cover which can be opened to check whether the device/disc has ever been rotated. Although not as convenient, it will be appreciated that the device could be provided in forms other than that of a circular tube, although this is most convenient for utilizing the centrifugal force referred to above.

In the embodiment shown in FIG. 1, the tubular device 12 is incorporated into the disc itself. The associated process is thus suitable for mass production of factory recorded discs, with there being no 'spin' or rotation in the production method which would break the membranes. Accordingly with this mass production arrangement, the tube 12 could be embedded in the body of the disc around the central hole 11 as shown, or alternatively it could be sandwiched between, for example, the two outer layers of the disc during the production process. If deemed necessary, a 'master' disc could include the indication device, i.e. if one or more 'master' discs can be recorded using a 'no spin' method, recordable CDs which already incorporate the indication device could be used. Mass produced discs can then be copied from the master in the normal way by pressing or equivalent, this being in a 'no spin' manner so that the membranes would remain intact. Thus this aspect of the invention relates to a disc or the like article rotatable by drive means, in use, incorporating an indication device by means of which a purchaser/recipient can easily tell whether the article has ever been driven on a disc drive, i.e. whether the information on the disc could have been read/retrieved.

Another aspect of the invention relates to the device, per se, for example as shown in the embodiment of FIGS. 2 and 3. This is particularly applicable for use with a disc or the like article rotatable by drive means, in use, where there is individual utilization which involves a 'spin' or rotation method of writing/recording the information onto the disc or like article by the user/sender. In one embodiment of this arrangement, the indication device would be supplied as a self contained unit, in conjunction with a high performance sticker, which could be used to apply the tube 12 to the disc or like article once it has been 'recorded' upon using a 'spinning'/rotation method of writing, e.g. by the use of a compact disc recorder. Thus once the rotation of the disc has been completed, the tube 12 or other form of indication device is then applied to the disc by means of a suitable press-like applicator which can be part of the self contained unit, this, for example, sticking the device in position at the centre of the disc so as to form a similar arrangement to the mass produced disc of FIG. 1. By accurately lining up the CD relative to the indication device, perfect balance of the processed CD with indication means (essential for proper running on the drive) would be achieved. However any other appropriate method of fixing the indication device to the 'pre-recorded' disc can be used.

Accordingly it will be appreciated that the invention relates not only to a disc or like article incorporating 'therein' an indication device of the invention, but also to such an indication device per se for after-fitting. It will be appreciated that the article to which the indication device is fitted or into which it is incorporated can be of any shape, and moreover can be of any form, typically a CD-ROM, a music CD, a DVD compact disc or even a now generally obsolete vinyl disc of single, EP or LP form.

In one alternative embodiment, the device is in the form of a central circular tube constituting a hub about which the device is rotated on a disc drive spindle. Emanating radially outwardly from the hub are a number of spokes equi-angularly spaced around the hub, the spokes being straight tubes forming second enclosures separated from the first enclosure, namely the hub, by any suitable separation means, including those described hereinbefore. Prior to a first rotation the indication means is retained in the hub. Rotation causes the indication means to be subjected to centrifugal force and to enter the spokes, and preferably reach the respective ends thereof at the inner circular periphery of the disc to which the device is fitted in use or manufacture. It may be possible to select indication means such that graduations along one or more spokes show the amount of use of the disc, i.e. how far along the spoke the indication means has reached. If necessary, some means of allowing trapped air at the ends of the spokes to escape could be provided, so as not to prevent movement of the indication means. The indication means could be pressurised in such a way that would send the means all the way along each spoke, whilst not causing actuation during disc transportation.

In another alternative embodiment, there is separation means between a first enclosure and a second enclosure, which separation means includes or is wholly constituted by an outlet opening. Water, preferably coloured, is ordinarily held in the first enclosure by surface tension at the outlet opening, which could be specially designed to facilitate such retention. However on rotation of the device/disc, the surface tension is overcome by the water being 'pushed' through the outlet opening into the second enclosure where it acts as a visual indication that rotation has taken place. A suitable alternative liquid to water could of course be used instead.

In a still further alternative embodiment, there is a different clear liquid or gas in two separated enclosures respectively. When rotation occurs and the or each separation means breaks or otherwise ceases to retain the indication means, i.e. the clear liquids or clear gases, in their respective enclosures, the liquids or gases mix. The liquids or gases are selected so that the mixing produces a coloured composition which acts as said visual indication of the rotation having taken place. Accordingly it will be appreciated that as used herein the term 'indication means' includes solids, liquids and gases which are always visible, e.g. coloured, and also a solid, liquid or gas which normally is clear, but which when combined with a (different) solid, liquid or gas produces a visible resultant composition which provides said visual indication. Moreover in all embodiments the visual indication could be a colour change, and thus various combinations are possible, i.e. liquid and gas, liquid and solid, gas and solid, with the possibility of at least one of these combination indication means normally being non-clear.

In a yet still further alternative embodiment, use is made of a small electrical charge which may possibly be generated by way of friction when the CD is rotated on the drive means. Accordingly some kind of conductant display method could be utilized to provide a visual indication that the disc has been rotated. The indication device need not be circular, i.e it could be of any shape or size, such as a small patch on one side of the CD. Alternatively it could be disposed on the outer perimeter/periphery of the disc where most friction would be experienced. A counterbalance would be employed, e.g. at the exactly opposite side/edges to ensure the disc is balanced for proper rotation in the disc drive. In a still another embodiment, heat generated by the above mentioned friction is utilized to produce a visual indication of rotation having taken place. The indication means or the indication producing means in these cases can be considered to be the means which generate the friction, i.e. the means that 'provide' an indication (charge or heat) that rotation has occurred.

Although in most instances the indication that the 'disc' has been rotated will be a visual one, it could be that in some instances the indication is audible and/or tactile, with or without being visual. Here the indication means or indication producing means of the indication device could be considered to be the means which generate the audible/tactile affect.

In one variation, there is provided a 'mechanical' indication device. A very thin disc/plate of metal or other material is suspended in an inner enclosure in the protected article, e.g. a CD. The suspension medium could be air or a liquid/gel. The disc/plate is fixed to a pivot around which it can spin (angularly rotate). When the CD is received on its drive means, the disc/plate spins. The pivot can be of a screw type, so that the disc/plate will travel up or down the screw, and 'jam' into place at a predetermined position (destination). The dimensions of these components could be thinner than wafer-thin. Once the disc/plate is 'jammed' in place, it provides a visual indication that the CD has been spun. It could do this, for example, by smearing a minute amount of suitable indication means, such as the suspension means, onto the transparent inner surface of its case.

In a second variation, shown in FIGS. 4 and 5, at least one Liquid Crystal Display (LCD) 18 is used. In the illustrated embodiment, it is in the form of an annulus, spaced from, but concentrically around, the central hole in the disc 19. The LCD could be of a type which, once activated, remains activated, in the same way that photographic film remains imprinted with light. The activation of the LCD could be triggered by heat or electricity generated by the spinning of the article, e.g. a CD, incorporating the LCD, or by laser light from the article reader whilst the disc is spun. FIGS. 4 and 5 respectively show the LCD deactivated and activated, the activated LCD being indicated by numeral 18a. Alternatively, the LCD could merely be an area on the body of the disc, for example, a triangular area.

In a third variation, indication means in the form of laser light reactive material (possibly organic/biological) could be included as an ingredient of the plastics/silicone or other mixture from which the article, e.g. a CD, is manufactured. Alternatively the laser light reactive material could be in the form of a (thin) plate/disc or the like which is incorporated into the CD itself. Once the 'reading' of the CD commences, in use, i.e. once the laser light of the reading device strikes the material, its appearance would change in a clearly visible manner. The 'signaling' effected by the change could be a change of colour and/or change of texture, or the like. Alternatively the 'signal' could be audible and/or tactile, with or without being visual.

A further embodiment relates to the use with all variations of the 'alert' indication device of the invention of photochromic material to provide means of verifying whether a disc or like article is genuine.

The photochromic material changes state under exposure to suitable light (electromagnetic radiation of a certain wavelength), the change remaining for a time after removal of said light. In this manner a manufacturer or supplier can use photochromic (photochemical) material which when subjected to non-visible light, e.g. ultraviolet light, changes to a different colour, or different shade, or displays an identifying or other logo, or writing or a picture, each of which can be unique to the manufacturer or supplier, thus showing that the article, e.g. an optical disc, is genuine, i.e. an original and not a (counterfeit) copy. The photochromic material can be one compound of the material from which the article, e.g. a CD, is manufactured, e.g. mixed with the polycarbonate substrate compound. Alternatively the photochromic material can be secured to the disc, e.g. by adhesive or by being embedded into its surface, or be sprayed onto part of the disc, e.g. in the same manner as printing on the disc surface.

FIGS. 6 to 9 show an indication device in the form of a flat tube 110, made of glass, plastics or other transparent material. The flattening increases visibility from above. Typically the tube (device housing) is very small, for example with a length of 4 cm, a width of 3 mm, and a depth of 1 mm. Whilst the respective side walls and end walls of the tube may be of the same constant thickness, the upper and lower wall thicknesses can be less.

FIG. 6 shows a gel (in this embodiment a silica oil gel) 111 in the sealed tube 110, which acts, in use, as indication means in the same manner as previously described. The gel is in the end part of the tube (the alert area) disposed, in use, nearest the disc centre, whilst the remainder of the tube shown in FIG. 6 merely contains air, with a membrane 112 effectively being formed between the gel and the air, although said membrane is due to the surface tension of the gel's viscosity and need not be a separate structural dividing member. However, this could be provided if required. Preferably, the gel occupies a significant area of the inside of the tube. With a circular disc, for example a CD or other optical disc, two tubes 110 are secured to the upper surface of the disc along a diameter of the disc at respective opposite sides of its centre. It will be understood that although a single tube would suffice, a pair of tubes is preferred to maintain the balance of the disc during rotation. As described, rotation of the disc at or above a predetermined angular velocity will cause the gel to travel up along the tube as a result of the centrifugal force generated by the disc rotation. This causes a mixing of the gel within the whole tube, and thus clearly shows that the disc has been used, i.e. rotated. Someone checking the security of the disc is thus clearly able to establish, by looking at the nature of the gel in the tube, that the disc has been used at least once. Alternatively, in the preferred embodiment, instead of a spreading of the gel within the whole of the tube, the gel 111 or other indication means could merely (bodily) transfer into the originally empty area (the alert area), so that the area which originally contained the gel then becomes empty. This is the the embodiment shown in FIGS. 6 and 7, where upon rotation of the disc, the gel bodily transfers to the opposite end of the tube, as shown in FIG. 7.

One particular form of gel 111 can contain photochromic material, i.e. material which changes colour or shade, or other characteristic, reversibly, in light of a particular frequency or intensity. In particular the photochromic material mixed with the gel in the straight tube 110 of FIGS. 6 and 7 can display its normal characteristic in white light, i.e. normal visible light, whilst displaying a different characteristic after being subjected to ultraviolet light. The ultraviolet light can be provided at any convenient apparatus, for example a conventional bank note checker, a hand-held device or a barcode scanner. The material can be tailored to the requirement of the manufacturer or supplier so as to provide a distinctive, individual, indisputable 'signature' to indicate the origin of the disc, i.e. manufacturer or supplier. The photochromic material can be such that under after exposure to UV light it merely changes colour or shade, or displays a logo, wording or a picture, the logo, wording and picture aspects being more applicable to when the photochromic material is used in the manufacture of the disc, as will be described in relation to FIGS. 15 and 16. The end user of the optical disc will receive information as to the correct colour etc., to which the photochromic indicator will change.

The only difference between the tube 110a of FIGS. 8 and 9, and the tube 110 shown in FIGS. 6 and 7, is that the gel 113 in the tube 110a contains the specific photochromic material. Accordingly after ultraviolet light is shone on the tube 110a of FIG. 8, the appearance will change to that shown in FIG. 9, i.e. the gel will change colour. If the particular colour is known to be associated with a particular manufacturer or supplier, then this will verify that the disc is genuine. Clearly the exposure to UV light can occur before or after the tube has been subjected to centrifugal force, i.e. when the tube is as in FIG. 6 or as in FIG. 7.

Accordingly it will be appreciated that with this arrangement there is provided not only an indication device to establish whether or not a disc has been used, but also a verification device to establish whether the disc originates from an authorised manufacturer/supplier. The effect will effectively be 'switched' in that once the ultraviolet light has been removed the genuine unique colour or shade will, in time, in normal light, fade back to its original state shown in FIG. 8 until once again the tube is exposed to ultraviolet light. Alternatively, a 'blast' of white light can be provided to return the photochromic material to its original state. Thus the change from exposure to one type of light to another can effect this switching. In FIGS. 8 and 9, the gel is indicated by the numeral 113 in its normal form, i.e. when in ordinary daylight, and by the numeral 113a in its switched form, i.e. after being subjected to ultraviolet light. The switching can be carried out an unlimited number of tines. In one embodiment it may be that the material thermally fades back to its 'white light' state.

FIGS. 10 to 12 show a (skeleton) chassis or frame 114 used for affixing a pair of the tubes 110 (or 110a) to a disc 115 instead of merely affixing each tube individually. The frame 114, which can be a thin plastics material sheet, can have a central circular portion 116 to be received in a correspondingly sized central recess in the disc 115. Extending radially from the portion 116 in respective aligned opposite directions therefrom are arms 117, 118 which are of a length and width to accommodate a flat tube 110, the tubes being shown respectively in position on the two arms. As can be seen from FIG. 12, the arms are extremely thin, for example having the same depth as a tube 110. The frame can be in the form of a high performance sticker so that backing material can, in a known manner, be peeled off both sides of the frame so that the undersides of the arms can be adhesively secured to the upper surface of the disc 115 to hold the frame to the disc, adhesive securement also being possible at the central circular portion 116 of the frame 114 with the disc. In a preferred embodiment the upper surfaces of the arms are similarly formed with adhesive which is exposed when backing material is peeled therefrom, and this allows the tubes 110 to be secured in place on the arms by means of said adhesive. However, it is not essential that both sides of the frame are formed with such adhesive and backing, and it may be that this applies in most instances only to the underside for its securement to the disc, some other form of securement being employed to secure the tubes to the upper surfaces of the arms. The nature of the adhesive used to secure the frame to the disc 115 will usually be such so as to make separation of the frame from the disc 115 impossible without irreversibly damaging the disc. FIG. 10 shows the disc before it has been spun, whilst FIG. 11 shows it after spinning, with the gel 111 now moved bodily along its associated tube, as in FIG. 7.

FIGS. 13 and 14 show a disc 119 to which it is secured an indication device in the form of a circular glass tube 120 in a similar way to FIGS. 1 to 3. However here the tube 120 is around the outer periphery of the disc. Moreover the arrangement shown in FIGS. 13 and 14 differs in that the tube contains a gel 121 with the 'membranes' 122 at the opposite ends respectively of the gel being formed solely by the fact that there is a surface tension effect due to the gel's viscosity which under normal conditions retains the gel in place. For example if the disc is dropped or mis-handled during transportation there is no spreading of the gel, i.e. breaking of said membranes. If however the disc 119 is rotated at or above a predetermined angular velocity, then the membranes 122 are 'broken' and the gel spreads around the tube to provide a visual indication that the disc has been used. Although it is possible to use either straight tubes or circular (annular) tubes to contain the visual indication means, it may be that a straight tube, either alone, or in pairs as shown in FIGS. 10 and 11, is more acceptable, in that with a circular tube at the centre of the disc the centrifugal force may in some instances be insufficient to effect breaking of the membranes. However it is believed that a circular tube would be acceptable if used around the outer periphery of the disc where the centrifugal force would be greater. Of course, any shape of tube is acceptable, providing it can be arranged on the disc so that the membranes are broken on rotation above the predetermined angular velocity. The tube can be stained by the gel as it passes along/around it. The volume 123 which initially does not contain the gel, could be empty (contain only air) or contain a liquid, gas or solid to mix with the gel.

FIGS. 15 and 16 show an optical disc 124, for example a CD, which is made wholly or partly of photochromic material, e.g. that referred to in relation to the gel of FIGS. 3 and 4, so that the disc itself is responsive to a change from white to ultraviolet light in the same manner as described for the gel in FIGS. 3 and 4. Although not shown, the disc 124 would include indication means, e.g. it would have one or more tubes 110, or even 110a, attached to its surface. In one embodiment, the photochromic material is applied to the surface of the disc under a protective lacquer coating. One example of suitable photochromic material is Photosol (RTM), manufactured and sold by PPG Industries, Inc. of Pittsburgh, U.S.A.

With FIG. 16, the disc is shown after having been subjected to ultraviolet light, (whether or not it has been rotated), and it can be seen that previously invisible wording 125 formed by the photochromic material is now visible. Alternatively or additionally, the colour or shade of the disc could change due to the presence of the photochromic material. If the wording, logo, colour etc is identified as originating from the manufacturer or supplier of the disc or otherwise verifies the disc, then by using both the indication means and the photochromic material, it can be seen that the CD is not only brand new but is also genuine. The colour change or the appearance of the wording or logo may take approximately one minute to occur, although this may vary depending upon the intensity of the ultraviolet light to which the disc is subjected. Once the UV light source is removed, the wording, logo or the genuine unique colour will begin to fade. In other words the disc will switch back to its original normal colour in daylight, with this fading of the genuine unique colour, wording etc occurring over a period of time, the disc then remaining as shown in FIG. 15, until it is again exposed to UV light. Of course once the indication means of the disc have been 'triggered', such means will never return to the 'brand new' state shown for the tubes 110 in FIG. 10 where the gel is at the 'inner' end of each tube.

Thus with the disc shown in FIGS. 15 and 16, it will be appreciated that it would be possible to tailor the photochromic material so that when ultraviolet light is shown on to it there is disclosed a logo, wording or picture identifying, for example, the manufacturer and/or supplier of the disc, to indicate that if this is visible then the disc is genuine and, conversely, that if it is not then the disc is a counterfeit, copy or fake. Of course the photochromic material can be of any colour, shade, appearance etc before actuation, the important quality being its change upon actuation.

It will be appreciated that although the 'tailored' photochromic material has been described in two alternative forms, namely within the gel or forming the whole or part of the material of the disc, it would be possible merely to affix a lesser or greater patch of such photochromic material to the disc or to a tube, or to spray photochromic material thereon. Alternatively the photochromic material could be mixed with the polycarbonate substrate compound before it is formed into the disc, it being appreciated that it is merely necessary to provide at least a small amount of a photochromic material somewhere in or on the disc, including in or on the security/indication means, so that once UV or other non-white light to which the photochromic material is sensitive, is shone onto the disc, the photochromic material changes appearance, as described to indicate/verify whether or not the disc is genuine. As mentioned above, it would of course be possible to provide photochromic material which is sensitive, i.e. switches its appearance, in response to light of a different frequency/wavelength from that of ultra violet light, (e.g. laser light), although ultraviolet light is to be preferred, in view of its present common availability as described in bank note testing devices and the like.

To apply indication devices to an optical disc, the production process of the disc need not be changed, but rather a final process can be added where the device is simply applied by a robotic arm. It can be applied using heat to fuse the device to the disc, or glued on, or applied using a high performance sticker as previously described. It may be that the device is embedded into the disc's surface by digging or carving out a channel or gutter on the top of the disc and then pressing the device into it making permanent the application/incorporation. This is particularly convenient where the photochromic material is applied in the form of a patch. In situations where discs are produced by sandwiching two halves together, e.g. DVD's, the device can be installed between the two outer layers before they are joined. If necessary, channels can be dug or carved on the inner side of each disc plate before they are joined, to accommodate the device. In some instances an individual purchases can apply the device to a disc.

Although the membranes in the tubes have been described as being formed by the surface layer of the gel, alternatively the division between the gel and the air in the tube could be by way of a specific gel plug, or a plug of any other material and of any other shape. In one alternative the indication means, such as a gel, can be held in place by any type of temporary blocking barrier/one-way door mechanism.

Accordingly. Total protection can be provided particularly, but not exclusively, for users of business software who may unwittingly use illegal unlicensed (counterfeit) business software and are thus liable to prosecution and fines.

In a still further embodiment, the entire indication/security device is no thicker than two or three sheets of paper. Rather than the glass or plastic tubing mentioned above, the device housing is actually a thin plastic sheeting, designed to accommodate the indication means comfortably inside it. The principles here are exactly as those of the preferred device specifications above. This envisaged version does not look dissimilar to the patented battery/cell power level tester device supplied with the square 9V batteries, and manufactured by Duracell and sold under Trade Mark COPPER TOP™ TESTER.

As described, the photochromic material changes its state after exposure to UV light, with its change back not being instantaneous, i.e. the change remaining for a time after the UV light has been removed. This is quite different from the arrangement used with currency note checking, where photochromic material is not used. However the verification of the disc could be by way of this bank note checking technique, i.e. using 'invisible ink' which only registers, and does not change state, whilst subjected to UV light. This would be, like the use of photochromic material, in conjunction with the use of indication means to denote the disc has been spun.

A further aspect relates to PC's which have CD reading and writing abilities, e.g. which have means which are capable of reading a CD whilst at the same time writing onto it. The indication device would be adapted to take account of this CD read and write facility as follows. The first time a CD is used, the (laser) writer would write onto the CD. The next time the CD is used, an onscreen display would indicate that the CD had been read once. In fact it will be possible to convey detailed information such as how many times accessed, by whom, which PC etc.

As general non-exclusive specifications, as appropriate, for all the inventive aspects in this application, the following is to be noted:
  i) Devices and/or their components and their effects can be any material (solid/liquid/gas/plasma), shape, style, colour, shade of colour, transparent/clear. Any alert indications may be in the form of text, image, logo, picture etc.
  ii) Devices may be triggered/actuated and/or powered/driven by centrifugal force, heat, magnetic force, electricity, laser light, UV light, light of any or all other kinds, solar power, human touch or some other external or internal force.
  iii) Each of the security devices can be added/incorporated at the article's point of manufacture, or applied by an individual to a single article.

The invention claimed is:

1. A readable disc, in use rotatable by drive means, having indication means or indication producing means that provide an indication that rotation has occurred when the disc in use is first rotated at or above a predetermined angular velocity characterized in that the indication means or the indication producing means provide said indication that rotation has occurred without affecting reading of the disc during said first or any subsequent rotation of the disc.

2. A disc as claimed in claim 1, comprising a first enclosure, indication means or indication producing means in said first enclosure, and a second enclosure, said indication means or indication producing means being retained in the first enclosure until the disc is rotated, in use, at or above said predetermined angular velocity, whereupon there is passage of at least some of the indication means or indication producing means into the second enclosure and a resultant indication that rotation of the disc has occurred.

3. A disc as claimed in claim 2, wherein the resultant indication is visual.

4. A disc as claimed in claim 3, wherein said resultant indication can be viewed exteriorly of the disc, in use.

5. A disc as claimed in claim 2, wherein the first enclosure is separated from the second enclosure by breakable membrane means.

6. A disc as claimed in claim 2, wherein the indication means or indication producing means is a fluid.

7. A disc as claimed in claim 6, wherein the indication means or the indication producing means is a liquid.

8. A disc as claimed in claim 7, wherein the liquid is coloured.

9. A disc as claimed in claim 7, wherein said liquid in said first enclosure is clear, and said second enclosure contains further clear liquid, said liquids in said first and second enclosure respectively mixing upon said rotation of the disc, in use, at or above said predetermined angular velocity to provide a coloured visual indication of rotation having occurred.

10. A disc as claimed in claim 7, wherein the liquid is held in said first enclosure by surface tension at an outlet opening therefrom.

11. A disc as claimed in claim 1, wherein said indication means or said indication producing means is in the form of a tube having at least part thereof transparent.

12. A disc as claimed in claim 11, wherein the tube is circular in plan.

13. A disc as claimed in claim 12, wherein the circular tube is wholly transparent.

14. A disc as claimed in claim 11, wherein the tube comprises a circular hub from which at least one radial arm extends.

15. A disc as claimed in claim 14, wherein the hub and the at least one radial arm respectively constitute first and second enclosures, the first enclosure containing indication means or indication producing means.

16. A disc as claimed in claim 11, wherein the tube is straight.

17. A disc as claimed in claim 16, wherein the tube is flat.

18. A disc as claimed in claim 16, wherein the tube is wholly transparent.

19. A disc as claimed in claim 16, wherein the indication means or indication producing means is a gel.

20. A disc as claimed in claim 19, wherein the gel is held in said tube or a first enclosure of said tube by a membrane formed by the surface tension of the gel's viscosity.

21. A disc as claimed in claim 19, wherein the gel is arranged so that, in use, upon rotation of said disc it transfers bodily into said tube or a second enclosure of said tube.

22. A disc as claimed in claim 1, wherein the indication means or indication producing means is held in a first enclosure which is separated from a second enclosure, into which at least part of the indication means or indication producing means moves, in use, upon said rotation, by barrier means.

23. A disc as claimed in claim 22, wherein the baffler means are breakable films/sheets.

24. A disc as claimed in claim 1, wherein, in use, upon said rotation, the indication producing means produces a frictionally generated electrical charge which is utilized to provide said indication.

25. A disc as claimed in claim 24, wherein said indication is a conductant display.

26. A disc as claimed in claim 1, wherein, in use, upon said rotation, the indication producing means produces frictionally generated heat which is utilized to provide said indication.

27. A disc as claimed in claim 1, in which said indication that rotation has occurred is audible.

28. A disc as claimed in claim 1, in which said indication that rotation has occurred is tactile.

29. A disc as claimed in claim 1, in which said indication means or indication producing means is in the form of thin plastics material sheeting.

30. A disc as claimed in claim 1, including/incorporating photochromic material.

31. A disc as claimed in claim 30, wherein the indication means or indication producing means contains photochromic material.

32. A disc as claimed in claim 31, wherein the photochromic material is mixed with a gel.

33. A disc as claimed in claim 31, wherein the photochromic material changes its state, in use, when exposed to ultraviolet light.

34. A disc as claimed in claim 1, including a thin plate/disc on a screw-type pivot, which, in use, upon rotation of the disc, travels along the pivot to jam in a position which provides said indication.

35. A disc as claimed in claim 34, wherein said plate/disc is suspended in a suspension medium.

36. A disc as claimed in claim 34, wherein in said jammed position, in use, said plate/disc has smeared indication means to a surface of a case of the indication means or indication producing means.

37. A disc as claimed in claim 1, comprising a liquid crystal display which is activated, in use, by rotation of said disc.

38. A disc as claimed in claim 37, wherein the activation is by heat or electricity generated by the rotation of said disc, in use.

39. A disc as claimed in claim 37, wherein the activation is by laser light from a reader of the disc.

40. A disc as claimed in claim 12, wherein the tube is secured in a central circular opening through the disc.

41. A disc as claimed in claim 40, wherein the indication means or indication producing means is embedded in the body of the disc.

42. A disc as claimed in claim 41, wherein the indication means or indication producing means is embedded around a central hole of the disc.

43. A disc as claimed in claim 1, wherein the indication means or indication producing means is sandwiched between two layers of the disc.

44. A disc as claimed in claim 1, having at its periphery indication producing means which, when the disc is rotated, in use, produce a frictionally generated electrical charge which is utilized to provide said indication.

45. A disc as claimed in claim 44, wherein a counterbalance is provided to said indication device disc, to balance the disc upon rotation, in use.

46. A disc as claimed in claim 1, having a frame secured to one side thereof and carrying a pair of said indication means or indication producing means.

47. A disc as claimed in claim 46, wherein the frame is adhesively secured to the disc and the indication means or indication producing means are adhesively secured to the frame.

48. A disc as claimed in claim 46, wherein the frame has a central circular portion received in a central hole of the disc and at least two arms extending radially from said central portion, said arms respectively carrying said indication means in the form of tubes.

49. A disc claimed in claim 48, wherein the frame is formed of a thin plastics material sheet.

50. A disc as claimed in claim 1, wherein the indication means or indication producing means is disposed continuously around the outer periphery of the disc.

51. A disc as claimed in claim 1, which has photochromic material on a surface thereof.

52. A disc as claimed in claim 51, wherein the photochromic material is applied to the disc surface under a protective lacquer coating.

53. A disc as claimed in claim 52, wherein a change of state of the photochromic material, in use, renders wording and/or a logo visible.

54. A disc as claimed in claim 1, in the form of a CD for use with a computer having both a reading and writing ability.

* * * * *